United States Patent Office 3,513,698
Patented May 26, 1970

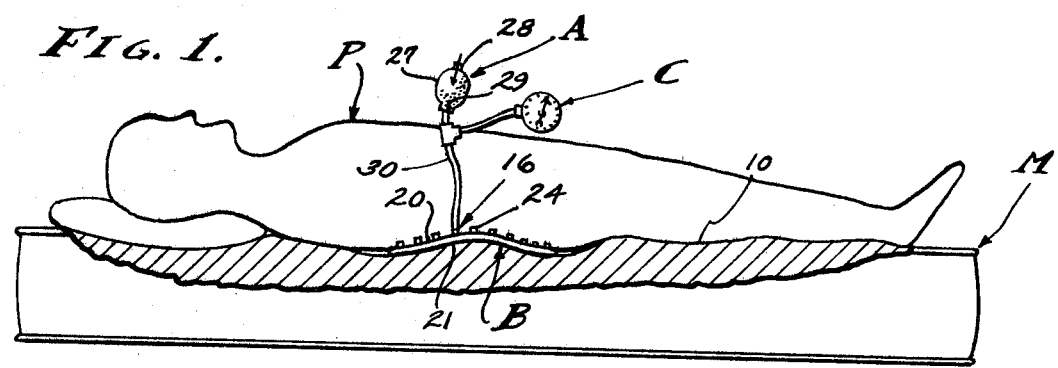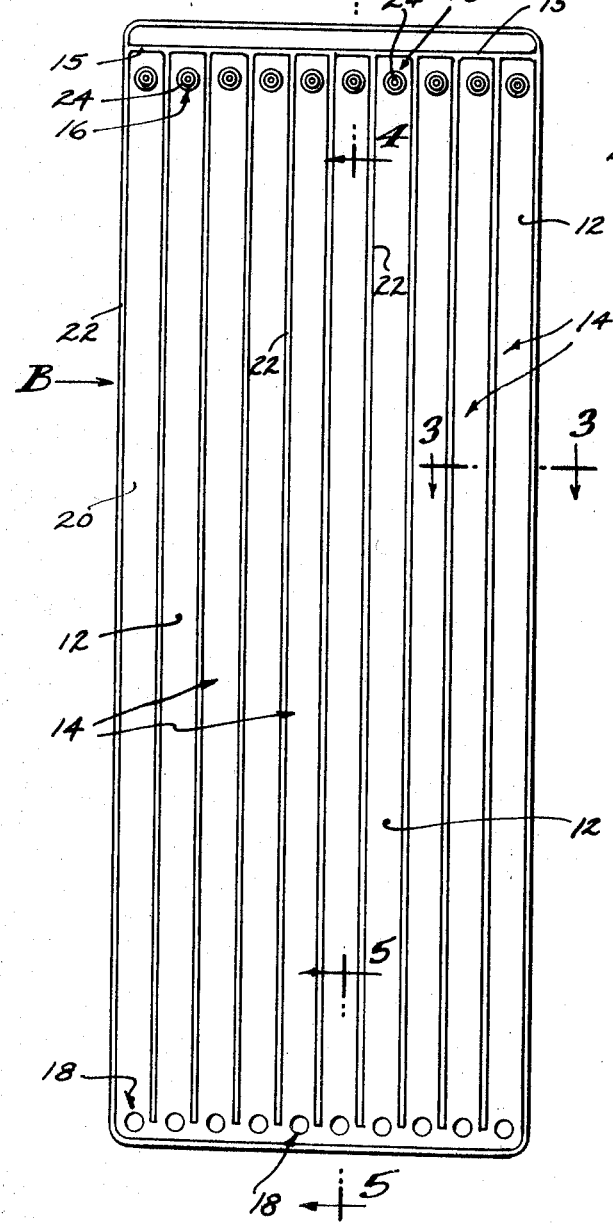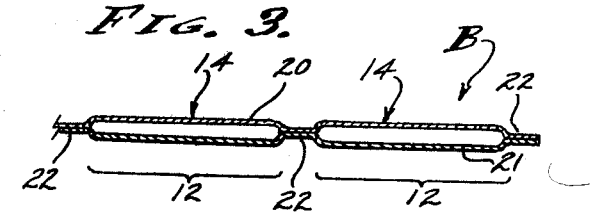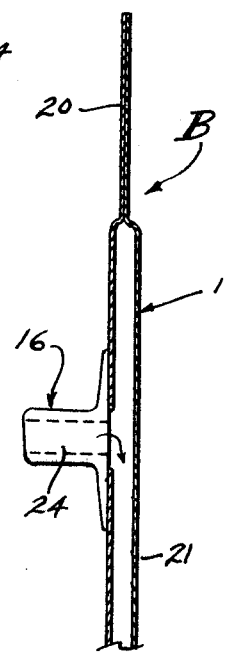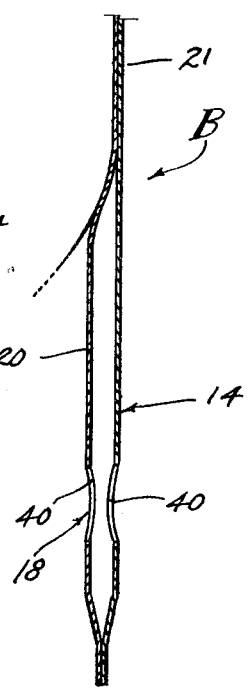

3,513,698
SKIN PRESSURE ANALYZER
Bernard W. Ross, Los Angeles, Calif., assignor to Integrity Products Corp., Los Angeles, Calif., a corporation of California
Filed Apr. 24, 1967, Ser. No. 633,009
Int. Cl. A61b *5/10*
U.S. Cl. 73—172  14 Claims

ABSTRACT OF THE DISCLOSURE

An apparatus for analyzing body pressures as between the skin of a reclining person and a support upon which he is lying, and particularly for determining the distribution of weight and pressures of the area upon which the person is lying. One or more pressure operated body supporting means is provided and to which a measured indicative pressure is applied, the escape of pressure from the body supporting means being the determining factor in establishing the limit of pressure required as a supporting force in each instance; whereby mattresses and the like are fitted to a person's particular needs.

---

Bedding, and particularly mattresses, for persons suffering from injuries and/or body imperfections is subject to diagnostic analysis, which heretofore has been lacking. The professions dealing with the problems of prescribing special bedding have been at a loss to determine with any accuracy the need for various supporting pressures in different areas of the body of persons. Many factors become involved, such as weight distribution, corpulency, injuries, surgery, deformations and malfunctions etc. and all of which is related to the development of skin rash, skin ulcers and bed sores generally. It therefore becomes apparent that a direct approach to the problem without disturbing the person is much to be desired. It is the determination of actual degree and placement of weights and pressures with which the present invention is concerned, as related to the body of a person reclining upon a bed or mattress.

An object of this invention is to provide a diagnostic apparatus for determining the application of actual body pressures as applied between a person and the supporting surfaces underlying said person.

Another object of this invention is to provide a diagnostic apparatus for the purpose above stated and which can be related to the person involved without adverse effect, without discomfort.

A further object of this invention is to provide a diagnostic apparatus of the character referred to and that accurately indicates weight and/or pressure individually in a plurality of areas. With the apparatus that I provide there is an accurate indication of the persons body weights and/or pressures as they are applied along spaced parallel lines or areas, and these lines or areas can be disposed as circumstances require transversely, longitudinally or diagonally and in any desired direction.

The various objects and features of this invention will be fully understood from the following detailed description of the typical preferred form and application thereof, throughout which description reference is made to the accompanying drawings in which:

FIG. 1 is a side view, with portions broken away to show in section, and illustrating the typical posture of a person reclining upon a mattress and wherein the diagnostic apparatus of the present invention is utilized.

FIG. 2 is a plan view of the characteristic element of the apparatus of the present invention.

FIGS. 3, 4 and 5 are enlarged detailed sectional views taken as indicated by lines 3—3, 4—4, and 5—5 on FIG. 2.

The diagnostic analyzer of the present invention is a weight and/or pressure sensing apparatus that is responsive to supporting pressures exerted along predetermined lines or areas. The apparatus involves a thin and flexible blank B which can be oriented as circumstances require to be disposed as desired. For example, the blanket B is normally disposed transversely of the mattress M upon which the person P lies, and for instance is applied beneath the small of the back and under the lumbar and sacroiliac regions. It is to be understood that the posture and disposition of the person can vary, and in the drawings a person P is shown lying in an ordinary manner on his back. For example, a variation would be a person sitting upon a cushion, in which case the blanket B of the present invention would be disposed beneath the posterior of the person and/or a second independent blanket B disposed behind the back of the person. As shown, the blanket B is oriented so as to extend transversely in which case the lines or areas of measurement are disposed transversely of the person P, and of the mattress M. It is to be understood that the underlying support can change in kind, but that it remains a cushioned support in its ultimate form. Therefore, it is feasible for the person P to lie upon a mattress M similar or identical to the ultimate mattress to be prescribed, and to indicate weight and/or pressure applied for the support at predetermined areas. In FIG. 2 of the drawings I have shown the blanket B apart from its use with a pressure supply A and pressure indicator C, while in FIG. 1 I have shown the blanket B as it is used to indicate applied force or pressure as it actually exists along one line or area extending transversely of the mattress M.

The blanket B is a unit of construction which can be incorporated in the top surface 10 of the mattress M, or independently constructed as indicated. Thus, the blanket B can be part of the mattress M, being integrally formed as part of the top surface 10 and/or combined in the ticking or cover thereof and coextensive with the top surface 10. However, it is sufficient that the blanket B be of limited size and such as to underlie but a portion of the person P subject to diagnosis and/or analysis. A practical size for a typical blanket B is to construct it of ten inches width and two and a half feet length. Thus, the length is ample so as to completely underlie a person P while the width is such as to be divided into ten equal one inch increments, each increment defining an area 12 subject to measurement.

The areas 12 which are subject to measurement are elongated and in the broad sense there can be one or more such areas. However, it is advantageous to provide a plurality of like areas in one blanket B, whereby a uniform pattern of areas is established. To this end, therefore, the areas 12 are alike and preferably identical and each involves a pressure operated body supporting means 14, an indicative pressure supply means 16 and a body weight responsive pressure release; and supply means 18. Essentially, the means 14, 16 and 18 comprise the characteristic features of the present invention, being incorporated in the blanket as shown in FIG. 2 and including the complementary apparatus as shown in FIG. 1 as may be required.

The pressure operated body supporting means 14 is in its broadest sense receptive to pressure and in its prefered form is receptive to the introduction therein of fluid under pressure and is subject to releasing said fluid at any pressure representative of the weight and/or pressure applied. That is, the supporting means 14 is in the broad sense receptive to hydraulic pressure, electrical pressure and/or mechanical pressure. To this end, the blanket B and its one or more means 14 is interposed, flatly, between the supporting surface 10 of the mattress M and the downwardly disposed skin surface of the person P. The blanket is, in its preferred form, made of a flexible material capable of withstanding the fluid pressures involved and without leakage. In practice a vinyl plastic material is employed in upper and lower layers 20 and 21 and which are fused together in longitudinally disposed seams 22. The seams 22 are parallel and are placed on one inch intervals, and to the end that each area 12 can be inflated.

The indicative pressure supply means 16 is adapted to introduce fluid under pressure to the force supporting and pressure limiting means 14 and comprises basically a closure 15 and a fluid induction tube 24 at one end of the means 14. As is shown, the means 16 is in the form of a nipple that receives air supplied under pressure from an aspirator pump. Said nipple opens into the interior of the pressure operated body supporting means 14. The aspirator pump comprises the usual bulb 27 with an intake check valve at 28 and with a supply check valve at 29. A delivery hose 30 extends from the check valve at 29 and to the said nipple and is selectively connected thereto to deliver pressured air into the force supporting and pressure limiting means 14.

The body weight responsive pressure release means 18 is adapted to discharge expendable fluid from the pressure operated body supporting means 14 and comprises a discharge port 40 at the end opposite the closure 15. In practice, there are aligned discharge ports 40 in the two layers 20 and 21, whereby air can discharge from either or both sides of the blanket. Consequently, the body parts of a person lying upon the top side of the blanket cannot block the exhaust, which will then flow out of the other side port 40.

From the foregoing it will be apparent that the blanket B comprises the essential and characteristic elements of the present invention. The said blanket B is inherently operable to sustain the weight or force of the person's body lying thereupon as is represented by the pressure of fluid charged therewithin. Specifically, the indicative pressure supply means 16 introduces fluid pressure to one end of the flexible tube comprising the said pressure operated body supporting means 14, whereupon said fluid progresses longitudinally of the tube to be stopped by the engagement of the upper and lower layers 20 and 21. The function of the body weight responsive pressure release means 18 is effected by the body weight or force of the person P that causes pressured engagement of the layers 20 and 21 effects the valve closure. The aspirator pump is then operated until the occurrence of fluid bypass and discharge through the port 40, at which occurrence a maximum fluid pressure is reached as is determined by the skin pressure and/or body weight applied at or along the area 12. The weight or inflation or the amount of layer separation can be relatively slight and thereby permits measurements of applied weight without appreciable movement or lifting of the person's body. The said measurements of pressure representing applied weight are taken by a suitable recording instrument C as in the form of a pressure gauge.

With the diagnostic analyzing apparatus hereinabove described it is possible to determine lines or areas of pressure which are then useable in prescribing corresponding forces to be applied by padding or upholstering as in a mattress or the like in the form of prescription bedding or a padding for the support of a person requiring the same. For instance, the prescription obtained with the instance apparatus is used in the construction of prosthetic devices and paraplegic devices which require paddings and cushions.

Having described only a typical preferred form and application of my invention, I do not wish to be limited or restricted to the specific details herein set forth, but wish to reserve to myself any modifications or variations that may appear to those skilled in the art:

Having described my invention, I claim:

1. Apparatus for the determination of pressure imposed upon a support by the body of a person engaging the same, and including, a pressure operated body supporting means disposed intermediate the support and the person's body, means supplying indicative pressure to the first mentioned means, and means responsive to the weight of the person's body to release pressure from the first mentioned means and thereby limiting the indicative pressure supplied by the second mentioned means.

2. The apparatus as set forth in claim 1 and wherein the pressure operated body supporting means is a fluid operated means, wherein the means supplying indicative pressure to the first mentioned means is a fluid pressure supply means, and wherein the means responsive to the weight of the person's body to release pressure supplied to the first mentioned means by the second mentioned means is a fluid pressure exhausting means.

3. The apparatus as set forth in claim 2, and wherein the pressure operated body supporting means is disposed intermediate the support and the person's body for the reception of fluid under pressure and for exhaustion by the last mentioned means of said fluid exceeding the pressure exerted by the force imposed by the person's body.

4. The apparatus as set forth in claim 2, and wherein the pressure operated body supporting means and the means responsive to the weight of the person's body to release pressure are combined in a collapsible tube disposed intermediate the support and the person's body, the last mentioned means comprising an exhaust port in the said tube.

5. The apparatus as set forth in claim 2, and wherein the pressure operated body supporting means and the means responsive to the weight of the person's body to release pressure are combined in a collapsible tube intermediate the support and the person's body for the reception of fluid under pressure and for exhaustion of said fluid exceeding the pressure exerted by the force imposed by the person's body, the last mentioned means comprising an exhaust port in the said tube.

6. The apparatus as set forth in claim 2, and wherein the pressure operated body supporting means and the means responsive to the weight of the person's body to release pressure are combined in an elongated collapsible tube disposed intermediate the support and the person's body for the reception and capture therein of fluid under pressure by closure along the tube due to applied force of the person's body.

7. The apparatus as set forth in claim 2, and wherein the pressure operated body supporting means and the means responsive to the weight of the person's body to release pressure are combined in an elongated collapsible tube of flexible upper and lower layers of sheet material disposed intermediate the support and the person's body for the reception and capture therein of fluid under pressure by closure along the tube due to applied force of the person's body.

8. Apparatus for the determination of pressure imposed upon selected areas of a support by the body of a person engaging the same, and including, a plurality of pressure operated body supporting means disposed adjacently in a blanket intermediate the support and the person's body, means supplying indicative pressure individually to each of the first mentioned means, and means separately responsive to the weight of the person's body to release pressure from each of the first mentioned means and thereby limiting the indicative pressure supplied by the individual application of the said second mentioned means.

9. The apparatus as set forth in claim 8 and wherein the plurality of pressure operated body supporting means are fluid operated means, wherein the means supplying indicative pressure individually to each of the first mentioned means are fluid pressure supply means, and wherein the means separately responsive to the weight of the person's body to release fluid pressure supplied to each of the first mentioned means by the individual application of the said second mentioned means are fluid pressure exhausting means.

10. The apparatus as set forth in claim 9, and wherein the pressure operated body supporting means are disposed adjacently in a blanket intermediate the support and the person's body for the reception of fluid under pressure and for exhaustion by the last mentioned means of said fluid exceeding the pressure exerted by the force imposed by the person's body.

11. The apparatus as set forth in claim 9, and wherein the pressure operated body supporting means and the means responsive to the weight of the person's body to release pressure are combined in a collapsible tube disposed intermediate the support and the person's body, the last mentioned means comprising an exhaust port in said tube thereof.

12. The apparatus as set forth in claim 9, and wherein the pressure operated body supporting means and the means responsive to the weight of the person's body to release pressure are combined in a collapsible tube disposed intermediate the support and the person's body for the reception of the fluid under pressure and for exhaustion of said fluid exceeding the pressure exerted by the force imposed by the person's body, the last mentioned means comprising an exhaust port in said tube thereof.

13. The apparatus as set forth in claim 9, and wherein the pressure operated body supporting means and the means responsive to the weight of the person's body to release pressure are combined in an elongated collapsible tube disposed intermediate the support and the person's body for the reception and capture therein of fluid under pressure by closure along the tube due to applied force of the person's body, and wherein the means separately responsive to the weight of the person's body thereby limiting the fluid pressure captured in each of the tubes by said individual closure thereof comprises an exhaust port in the said tube thereof.

14. The apparatus as set forth in claim 9, and wherein the pressure operated body supporting means and the means responsive to the weight of the person's body to release pressure are combined in an elongated collapsible tube of flexible upper and lower layers of sheet material disposed intermediate the support and the person's body for the reception and capture therein of fluid under pressure by closure of the tube due to applied force of the person's body, and wherein the means separately responsive to the weight of the person's body thereby limiting the fluid pressure captured in each of the tubes by said individual closure thereof comprises an exhaust port in said tube thereof.

References Cited

UNITED STATES PATENTS

| | | | |
|---|---|---|---|
| 2,666,327 | 1/1954 | Taylor | 73—172 |
| 2,932,968 | 4/1960 | Scoville | 73—172 |
| 3,305,036 | 2/1967 | Walters | 73—172 |

LAWRENCE W. TRAPP, Primary Examiner